_United States Patent Office_ 3,013,018
Patented Dec. 12, 1961

3,013,018
5-CYANOMETHYLENE-2-PYRROLIDONES
Clifford L. Dickinson, Jr., Wilmington, Del., assignor to
E. I. du Pont de Nemours and Company, Wilmington,
Del., a corporation of Delaware
No Drawing. Filed Apr. 24, 1959, Ser. No. 808,586
10 Claims. (Cl. 260—326.5)

The present invention is concerned with a new class of photographic developers and more particularly with 5-substituted-2-pyrrolidones.

In the compounds of this invention the presence of a substituted methylen group at the 5-position in the 2-pyrrolidone ring is associated with a generic superiority in utility of the compounds as photographic developers.

The new class of compounds comprises the 5-cyanomethylene-2-pyrrolidones. The 5-cyanomethylene-2-pyrrolidone configuration is new and this nucleus is fundamental to the characteristic property of these compounds of serving as color-coupling photographic developers.

Of the 5-cyanomethylene-2-pyrrolidones, a group particularly preferred as photographic developers are compounds of the formula

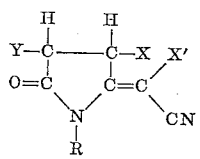

where R is a member of the class consisting of hydrogen, hydrocarbyl and substituted hydrocarbyl groups; X and X' are members of the class consisting of —CN, —SO$_2$R', —COOR', and —CONR'$_2$; Y is a member of the class consisting of hydrogen, —CN, —SO$_2$R', and halogen (i.e., fluorine, chlorine, or bromine); and R' is a member of the class consisting of hydrogen and hydrocarbyl groups. Substituents, if any, on the hydrocarbyl groups in R can be halogen, hydroxy, hydrocarbyloxy, oxo, —NR'$_2$, cyano, carboxyl, carbamyl, acyl, or sulfo.

The 5-cyanomethylene-2-pyrrolidones of this invention are prepared by the reaction of an α-substituted acetate or N-substituted acetamide with an alkali metal salt of the dimer of a hydrocarbylsulfonylacetonitrile, a cyanoacetic ester, amide, or nitrile. This process may be illustrated by the equation

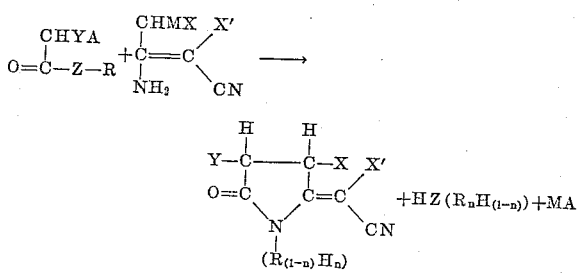

in which A is —Cl, —Br, or SO$_2$R', M is an alkali metal (such as Li, Na, K, Rb, or Cs); Z is —O— (in which case $n$ equals one) or —NH— (in which case $n$ equals zero); and R, R', X, X', and Y are as defined above.

As indicated by the wide variations in the examples, there are no process variables which appear critical. As shown in the examples, it suffices to bring the reactants together and no auxiliary materials are required.

It is convenient, although not essential, to employ as a reaction medium an organic solvent which is inert to the reactants and products. Thus, there may be employed aliphatic or aromatic hydrocarbons, dialkyl ethers, cyclic ethers, such as dioxane and tetrahydrofuran, alcohols, esters, N,N-dimethylformamide, N,N-diethylformamide, N-methylformanilide, N-methylformamide, formamide, N-methyl-N-ethylacetamide, N,N-dimethylacetamide, N,-N-diethylacetamide, tetramethylurea, tetraethylurea, pyridine, dimethylsulfoxide, acetonitrile, and mixtures of these liquids. Alcohols, esters, and alkanenitriles are the preferred class of solvents. Since the reaction of this process is mildly exothermic, the use of an inert reaction medium facilitates dissipation of the heat of reaction.

The temperature at which the reaction of this invention is carried out may be varied widely, for example, from temperatures below 0° C. up to the decomposition temperature of the reactants or products. In general, however, it is preferred to operate in the range of 0–200° C., and best yields are obtained when operating in the range of 20–100° C.

The reaction of a substituted acetate or acetamide with a salt of a dimer as described above takes place between equimolecular quantities of the reactants. However, this in no way limits the molar proportions of these reactants which may be brought together within the limits of the process. The relative amounts may be varied widely, for example, from molar ratios of 19:1 to 1:19. However, highest yields are obtained when approximately equimolar quantities are employed.

Pressure is not a critical variable in this process, and atmospheric pressure is ordinarily preferred for convenience, although pressures above or below atmospheric are operable.

This invention also embraces the process of developing a photographic element containing a reducible silver salt image with a color-coupling 5-cyanomethylene-2-pyrrolidone developing agent in the presence of a color former QH (having at least one hydrogen atom and being capable of condensing with oxidized p-phenylenediamine to form an azomethine dye), wherein Q is a monovalent organic radical, to yield a 5-cyanomethylene-2-oxo-3-pyrroline dye. The 5-cyanomethylene-2-oxo-3-pyrroline dyes are the subject of a copending application of Rudolph A. Carboni, filed concurrently herewith.

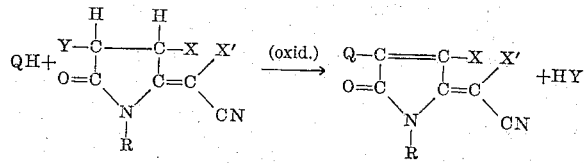

Developer solutions for use in this invention are prepared by dissolving from 0.01% to 5% or more by weight of one or more compounds of the above formula in an aqueous medium having a pH in excess of 7.6. The desired alkalinity may be obtained by incorporating in the medium suitable bases or salts, including alkali metal bicarbonates such as sodium bicarbonate or potassium bicarbonate, alkali metal carbonates, alkali metal hydroxides, alkali metal bisulfites, alkali metal borates, and alkali metal phosphates.

In the process for developing an exposed silver halide or latent image, the 5-cyanomethylene-2-pyrrolidone is oxidized to the corresponding 3-pyrroline. This 3-pyrroline is reactive toward the color former and reacts with it to form a 5-cyanomethylene-2-oxo-3-pyrroline dye. The color former may be present either in the exposed photographic layer or as a component in the developer solution. The reaction of the pyrroline with the color former takes place by condensation. When Y is —CN, —SO$_2$R', or halogen, this reaction with the color former takes place by condensation with elimination of HY. When Y is hydrogen, a similar bond is formed by oxidative abstraction of hydrogen from both the 3-pyrroline and the color former by the action of additional exposed silver halide.

After the 5-cyanomethylene-2-oxo-3-pyrroline dye is formed in the above developing process, the unexposed silver halide may be dissolved from the photographic emulsion and the reduced silver image bleached to customary photographic procedures to yield a colored image formed by the dye. The color of the dye image is determined by the color former employed. By using several photographic emulsion layers containing different color formers and separated, if desired, by suitable light filtering layers, full color images may be prepared either in negative form for copying or in positive form for printing or projection.

The color formers suitable for use in the photographic developing process of this invention are defined as those capable of condensing with oxidized p-phenylenediamine to form an azomethine dye, partly because the 5-cyanomethylene-2-pyrrolidones of this invention will couple (in oxidized form) with all the compounds that will couple with oxidized p-phenylenediamine, and partly because color formers which react with oxidized p-phenylenediamine are a large group of organic compounds well known and recognized in the art.

By the term "hydrocarbyl" used in defining R and R' in the products and process of this invention, I mean any monovalent organic radical composed solely of carbon and hydrogen. I use it in its full generic sense. The wide variation in the hydrocarbyl groups used in the illustrations which follow makes it evident that all hydrocarbyl groups are operable. Hydrocarbyl groups may vary as to whether they are saturated, unsaturated, alkyl, cycloalkyl, aryl, aralkyl, alkaryl, single ring, multi ring, straight chain, branched chain, large, small, and the like. The widest variation of this sort does not in any way detract from the fundamental characteristic of the hydrocarbyl radical of passing unchanged through the process of this invention and exercising no effect whatever on the chemical steps of the process.

The limitations of space for disclosure are not to be construed as any limitation within the scope of "hydrocarbyl" contemplated in this invention. Even the most cumbersome hydrocarbyl radicals such as those obtained by removing end groups from high molecular weight hydrocarbon polymer molecules containing thousands of carbon atoms, such as polyethylene, polyisobutylene, polyisoprene, polystyrene, and the like, are fully operable.

It is obvious that hydrocarbyl groups containing 20 or fewer carbon atoms are most available, and to that extent preferred. But there is to be no question of the operability of, or of the intent to include and disclose, any hydrocarbyl group whatsoever. Except for factors of bulk and dilution, wide variations in size and structure of hydrocarbyl radicals have no effect on the 5-cyanomethylene-2-pyrrolidones to which they are attached. All 5-cyanomethylene-2-pyrrolidones obtainable by variation of hydrocarbyl groups within the above definitions are hereby disclosed. Routineering to disclose each and every possible hydrocarbyl embodiment is superfluous.

In the illustrative examples which follow, parts are by weight unless otherwise specified.

EXAMPLE I

To a solution of 230 parts of sodium in 3957 parts of ethanol is added 1320 parts of malononitrile dimer and 1220 parts of ethyl chloroacetate. The mixture is heated under reflux with stirring for six hours and then cooled. The precipitate which forms is collected by filtration and found to be a sodium salt. This is dissolved in water and the solution is made acid with hydrochloric acid. The precipitate which forms is collected. Yield 382 parts of 4-cyano-5-dicyano-methylene-2-pyrrolidone, M.P. 234–237° C. It is recrystallized from water to give 138 parts, M.P. 238–239° C.

*Analysis.*—Calcd. for $C_8H_4N_4O$: C, 55.8; H, 2.3; N, 32.6. Found: C, 55.8; H, 2.5; N, 32.3.

EXAMPLE II

To a solution of 115 parts of sodium in 3947 parts of ethanol is added 660 parts of malononitrile dimer and 550 parts of N-methyl-α-chloroacetamide. The mixture is heated under reflux for 16 hours. The mixture is cooled, treated with anhydrous hydrogen chloride and filtered. The filtrate is diluted with five volumes of ethyl acetate and a tan amorphous powder which forms is removed by filtration. The filtrate is concentrated to about one sixth its volume by evaporation, passed over a column composed of 6000 parts of acid washed alumina and then eluted with ethyl acetate. The first 4500 parts is evaporated to give an oil that soon crystallizes, M.P. 120–160° C. The crude 4-cyano-5-dicyanomethylene-1-methyl-2-pyrrolidone is recrystallized four times from ethanol, yield 9 parts, M.P. 165.5–166.5° C.

*Analysis.*—Calcd. for $C_9H_6N_4O$: C, 58.1; H, 3.2; N, 30.1. Found: C, 57.9; H, 3.3; N, 30.3.

EXAMPLE III

To a solution of 23 parts of sodium in 395 parts of ethanol is added 152 parts of malononitrile dimer and 152 parts of α-chloro-N-butylacetamide. The mixture is stirred and heated under reflux for six hours. The resulting solution is acidified with gaseous hydrogen chloride and concentrated by evaporation. A dark brown solid separates upon cooling. This is collected and recrystallized several times from ethanol to yield 1-butyl-4-cyano-5-dicyanomethylene-2-pyrrolidone.

*Analysis.*—Calcd. for $C_{12}H_{12}N_4O$: C, 63.2; H, 5.3; N, 24.6. Found: C, 63.4; H, 5.5; N, 24.9.

EXAMPLE IV

A mixture of 120 parts of α-chloro-N-ethylacetamide and 155 parts of the sodium salt of malononitrile dimer in 783 parts of acetonitrile is stirred and heated under reflux for 15 hours. The resulting solution is filtered and the acetonitrile is removed by evaporation to give a thick viscous material that is dissolved in water. The aqueous solution is acidified with hydrochloric acid. The oil that separates becomes semisolid and is separated from the water. The residue is recrystallized from ethanol to give 39 parts of 4-cyano-5-dicyanomethylene-1-ethyl-2-pyrrolidone. After several recrystallizations from ethanol the M.P. is 153–154° C.

*Analysis.*—Calcd. for $C_{10}H_8N_4O$: C, 60.0; H, 4.0; N, 28.0. Found: C, 59.8; H, 4.1; N, 28.3.

EXAMPLE V

Part A

A mixture of 310 parts of the sodium salt of malononitrile dimer and 266 parts of α-chloro-N-allylacetamide in 1957 parts of acetonitrile is stirred and heated under reflux with stirring for 15 hours to yield a solution containing 1-allyl-4-cyano-5-dicyanomethylene-2-pyrrolidone.

Part B

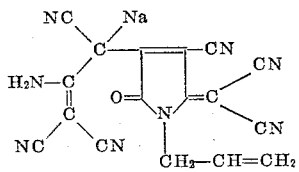

A portion of the solution obtained above is rendered alkaline (pH above 7) with sodium carbonate and potassium ferricyanide oxidizing agent is added. The 1-allyl-4-cyano-5-dicyanomethylene-2-pyrrolidone is oxidized to 1-allyl-4-cyano-5-dicyanomethylene-2-oxo-3-pyrroline which couples with excess sodium salt of malononitrile to yield the sodium salt of 1-allyl-3-(1-[1-amino-2,2-dicyanovinyl]-1-cyanomethyl)-4-cyano-5-dicyanomethylene-2-oxo-3-pyrroline as a red dye.

Part C

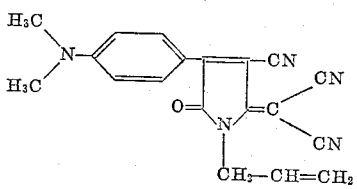

To another portion of the solution obtained as noted in Part A above an excess of dimethylaniline is added. The mixture is then rendered alkaline (pH above 7) with sodium carbonate and potassium ferricyanide oxidizing agent is added. Under these conditions the 1-allyl-4-cyano-5-dicyanomethylene-2-pyrrolidone is oxidized and couples with dimethylaniline to yield 1-allyl-4-cyano-5-dicyanomethylene-3-(p - N,N - dimethylaminophenyl)-2-oxo-3-pyrroline as a blue dye.

EXAMPLE VI

Part A

A mixture of 183 parts of α-chloro-N-benzylacetamide and 155 parts of the sodium salt of malononitrile dimer in 1957 parts of acetonitrile is heated under reflux with stirring for 15 hours to yield a dark solution containing 1-benzyl-4-cyano-5-dicyanomethylene-2-pyrrolidone.

Part B

The solution obtained in Part A is treated with N,N-dimethylaniline, sodium carbonate, and potassium ferricyanide as in Part C of Example V to obtain 1-benzyl-4-cyano-5-dicyanomethylene-3-(p - N,N - dimethylaminophenyl)-2-oxo-3-pyrroline as a blue dye.

EXAMPLE VII

Part A

A mixture of 264 parts of α-chloro-N-β-cyanoethylacetamide and 310 parts of the sodium salt of malononitrile dimer in 3131 parts of acetonitrile is heated under reflux for 16 hours to yield a solution containing 4-cyano-1-β-cyanoethyl-5-dicyanomethylene-2-pyrrolidone.

Part B

The solution obtained in Part A is treated with N,N-dimethylaniline, sodium carbonate, and potassium ferricyanide as in Part C of Example V to obtain 4-cyano-1-β-cyanoethyl-5-dicyanomethylene-3-(p - N,N - dimethylaminophenyl)-2-oxo-3-pyrroline as a blue dye.

EXAMPLE VIII

Part A

A mixture of 275 parts of α-chloro-N-β-hydroxyethyl-acetamide, 310 parts of the sodium salt of malononitrile dimer and 1957 parts of acetonitrile is heated under reflux with stirring for 18 hours. Ammonia is evolved and the resulting solution contains 4-cyano-5-dicyanomethylene-1-β-hydroxyethyl-2-pyrrolidone.

Part B

The solution obtained in Part A is treated with N,N-dimethylaniline, sodium carbonate, and potassium ferricyanide as in Part C of Example V to obtain 4-cyano-5-dicyanomethylene-3-(p - N,N - dimethylaminophenyl)-1-β-hydroxyethyl-2-oxo-3-pyrroline as a blue dye.

EXAMPLE IX

A strip of a commercial color photographic film having three gelatino-silver halide emulsion layers, each containing a different color former ("Super Anscochrome" tungsten type film, General Aniline and Film Corp., Binghamton, N.Y.), is exposed for 20 seconds through a colored slide transparency in a light box using diffused tungsten light. The exposed film is then immersed for 10 minutes in an aqueous developing solution containing 5% sodium carbonate, 2% potassium bromide, and 2% 4-cyano-5-dicyanomethylene - 1 - methyl - 2 - pyrrolidone. The developed film is then fixed, washed, bleached, and washed in the usual manner for processing color photographic film. The result is a colored transparency bearing a colored pattern in shades of red and blue corresponding to the pattern of the original transparency in shape, the colors being altered because of the different developer employed. Each of the three developed layers contains a different 3-substituted-4-cyano-5-dicyanomethylene-1-methyl-2-oxo-3-pyrroline dye, the respective 3-substituents corresponding to the color formers in the respective layers of the film.

EXAMPLE X

A three-layer color photographic film is prepared in which the essential ingredients in each layer comprise silver bromoiodide dispersed in a polyvinyl acetal. In one layer the acetal groups include those obtained from polyvinyl alcohol and m-(benzoylacetoacetamido)benzaldehyde. In the second layer the acetal groups include those obtained from polyvinyl alcohol and m-(3-methylsalicylamido)benzaldehyde. In the third layer the acetal groups include those obtained from polyvinyl alcohol and m-(p-[3-methyl-5-pyrazolon - 1- yl] - benzamido)benzaldehyde. This film is exposed for 2.0 minutes under a stepwedge in a light box using diffused tungsten light. The exposed film is developed for 22 minutes in the developer solution described in Example IX. The developed film is then fixed, washed, bleached, and washed by standard photographic procedures. The result is a colored image of the stepwedge in which the several layers are colored respectively by the following dye structures:

(a) 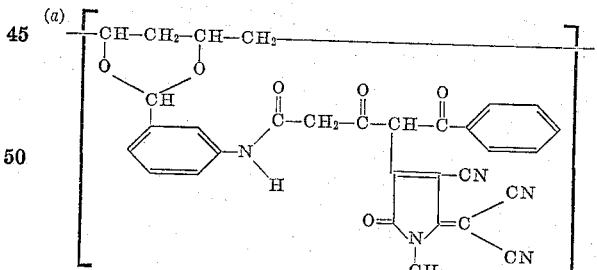

(b) 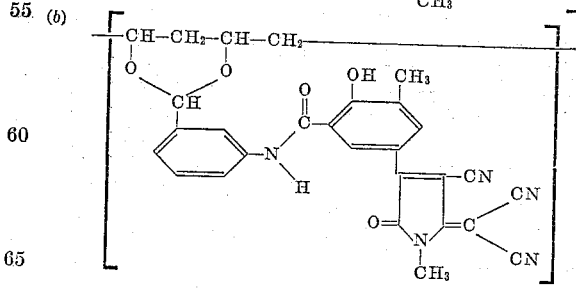

(c) 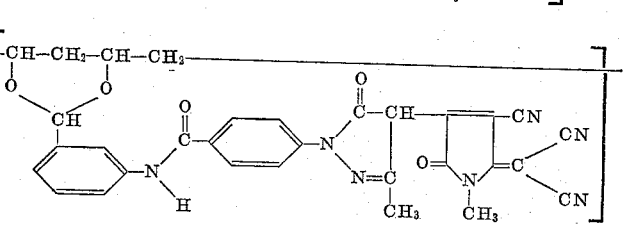

EXAMPLE XI 4-cyano-5-dicyanomethylene-1-methyl-2-pyrrolidone is dissolved in a mixture of water and ethanol made alkaline by the addition of sodium bicarbonate. N,N-dimethylaniline is added and the mixture is oxidized by the addition of a 10% solution of potassium ferricyanide. 4-cyano - 5 - dicyanomethylene-3-p-dimethylaminophenyl-1-methyl-2-oxo-3-pyrroline is formed as a blue dye.

EXAMPLE XII

Malononitrile dimer is substituted for N,N-dimethylaniline in the procedure of Example XI. 3-(1-amino-2,2-dicyanovinyl)cyanomethyl-4-cyano - 5 - dicyanomethylene-1-methyl-2-oxo-3-pyrroline forms as a red dye.

EXAMPLE XIII 3-methyl-1-phenyl-5-pyrazolone is substituted for N,N-dimethylaniline in the procedure of Example XI. 4-cyano - 5 - dicyanomethylene - 1 - methyl-3-(3-methyl-1-phenyl-5-pyrazolon-4-yl)-2-oxo-3-pyrroline forms as a magenta dye.

EXAMPLE XIV

N-methylaniline is substituted for N,N-dimethylaniline in the procedure of Example XI. 4-cyano-5-dicyanomethylene - 1 - methyl-3-p-methylaminophenyl-2-oxo-3-pyrroline forms as a blue dye.

EXAMPLE XV

A black and white photographic film having a cellulose acetate base and a gelatin coating containing dispersed silver bromide is fogged by exposure to daylight. It is then placed in an aqueous developer solution containing 0.2% 4-cyano-5-dicyanomethylene - 1 - methyl-2-pyrrolidone, 5% sodium carbonate and 1% of the color former m - (3 - methylsalicylamido)-benzaldehyde polyvinyl acetal. The film is developed for about 20 minutes. It is then fixed, washed, and bleached (to remove the silver fog) and washed again in the usual manner for processing color photographic films. The film is colored blue because of the coupled dye corresponding to structure (b) in Example X.

EXAMPLE XVI

A single-layer color photographic film is prepared in which the essential ingredients in the photographic emulsion layer are (a) the reaction product of m-(3-methylsalicylamido)-benzaldehyde ethylene glycol acetal and o-sulfobenzaldehyde with polyvinyl alcohol and (b) dispersed silver bromoiodide. A strip of this film is exposed to tungsten light through a stepwedge. The exposed silver halide is first developed for 10 minutes in the following black and white developer:

| | Parts |
|---|---|
| Metol | 3.5 |
| Sodium sulfite | 40.0 |
| Hydroquinone | 7.0 |
| Sodium carbonate | 34.0 |
| Sodium thiocyanate | 2.0 |
| Potassium bromide | 2.0 |
| Water, to make | 1000 |

The film is then exposed to daylight for several minutes to expose the remaining silver halide. This is then developed by placing the film in the following color developer solution:

| | Parts |
|---|---|
| 4-cyano-5-dicyanomethylene - 1 - methyl-2-pyrrolidone | 2.0 |
| Potassium bromide | 2.0 |
| Sodium sulfite | 0.5 |
| Sodium sulfate | 10.0 |
| Sodium carbonate | 50.0 |
| Pyridine | 19.7 |
| Water, to make | 1200 |

The film is developed in the color developer for 12 minutes. It is then washed in water for one minute and fixed for five minutes in the following fixer solution used at a dilution of one part fixer in 2 parts of water:

| | | |
|---|---|---|
| Hypo | g | 240 |
| Sodium sulfite | g | 15 |
| Borax | g | 18 |
| Glacial acetic acid | ml | 12 |
| Potassium alum | g | 20 |
| Water, to make 1 liter | | |

The film is then washed for 10 minutes in water and bleached by placing it for five minutes in the following bleaching solution:

| | G. |
|---|---|
| Potassium ferricyanide | 100 |
| Boric acid | 10 |
| Borax | 5 |
| Water, to make 1 liter | |

The bleached film is washed in water for two minutes, fixed for five minutes in the above fixer solution used at full strength, washed in water for 10 minutes and dried. The resulting film carries a blue image of the stepwedge, the blue color being due to the dye structure shown as (b) in Example X.

EXAMPLE XVII

A comparison of the photographic developing action of the products of Examples II, III, and IV is made as follows. Three strips of a commercial positive black and white film (Du Pont, Type 825) are given identical exposures to tungsten light through a stepwedge. The films are then developed in separate developer solutions, the basic formula for each solution being as follows:

| | Parts |
|---|---|
| Developer | 2 |
| Potassium bromide | 2 |
| Sodium carbonate | 60 |
| Water, to make | 1200 |

In the first solution the developer is 4-cyano-5-dicyanomethylene-1-methyl-2-pyrrolidone. In the second and third solutions the developers are the corresponding 1-ethyl and 1-butyl pyrrolidones respectively. The films are all developed for nine minutes and then fixed in 25% hypo, washed with water and dried. Each film carries a clear image of the stepwedge with a very low fog level in the clear areas. The density of the silver in the dark areas of the image of the stepwedge varies somewhat from film to film, being darkest in the film developed with 4-cyano-5-dicyanomethylene-1-methyl-2-pyrrolidone and being observably and successively less dark in the films developed with the corresponding 1-ethyl and 1-butyl pyrrolidones respectively.

EXAMPLE XVIII

Part A

Fifty parts of the dihydrate of the monosodium derivative of 4-cyano-5-dicyanomethylene-3-hydroxy-2-oxo-3-pyrroline (Carboni et al., J. Am. Chem. Soc., 80, 2838–40 (1958)) is suspended in 157 parts of acetonitrile, and 60 parts of oxalyl chloride is added. The mixture is stirred and heated at reflux for one hour. The mixture is then cooled and the precipitate which forms is collected by filtration, washed with acetonitrile and dried under reduced pressure to obtain 36 parts (80% yield) of crude 3-chloro-4-cyano-5-dicyanomethylene-2-oxo-3-pyrroline in the form of buff-colored crystals. It is purified by sublimation at 180° C. and 0.1 mm. pressure to give colorless crystals.

*Analysis.*—Calcd. for $C_8HN_4ClO$: C, 47.06; H, 0.49; N, 27.45; Cl, 17.40. Found: C, 47.53; H, 0.77; N, 27.28, 27.46; Cl, 16.99, 17.04.

Part B

A mixture of 204 parts of 3-chloro-4-cyano-5-dicyanomethylene-2-oxo-3-pyrroline, 7868 parts of glacial acetic acid, and 50 parts of platinum oxide catalyst is placed in a glass reactor and hydrogen at 30 lb./sq. in. pressure is admitted. The reactor is agitated and hydrogen is taken up at room temperature over a period of three hours. The reduction reaction yields 4-cyano-5-dicyanomethylene-2-pyrrolidone which is formed in solution. As it is formed, it couples with excess 3-chloro-4-cyano-5-dicyanomethylene-2-oxo-3-pyrroline to form the dye bis-3,3'-(4-cyano-5-dicyanomethylene - 2 - oxo - 3-pyrroline) which shows as a blue color when the mixture is poured into water. When the aqueous solution is rendered strongly alkaline the dye turns green and when rendered strongly acid it turns magenta in color.

EXAMPLE XIX

A mixture of 228 parts of N-benzyl-α-bromoacetamide and 155 parts of the sodium salt of malononitrile dimer in 1957 parts of acetonitrile is stirred and heated under reflux for 18 hours. The mixture is then rendered acid with hydrochloric acid and filtered. The filtrate is evaporated under reduced pressure to yield 1-benzyl-4-cyano-5-dicyanomethylene-2-pyrrolidone in the form of a viscous oil. This compound is tested as a photographic developer using the procedure of Example XVII. When a development time of 60 minutes is used, a sharp demarcation between exposed and unexposed areas of the film is obtained.

EXAMPLE XX

A mixture of 119 parts of N-allyl-α-bromoacetamide, 95 parts of the sodium salt of malononitrile dimer, and 783 parts of acetonitrile is stirred and heated at reflux for 18 hours. The mixture is cooled to room temperature, treated with gaseous hydrogen chloride until acid and filtered. The filtrate is concentrated by evaporation under reduced pressure in a nitrogen atmosphere. The viscous product is chromatographed over acid alumina with ethyl acetate to obtain 1-allyl-4-cyano-5-dicyanomethylene-2-pyrrolidone as a clear colorless oil. This compound is tested as a photographic developer using the procedure of Example XVII. When a development time of 40 minutes is used, a strong image of the step-wedge is obtained.

Other compounds within the scope of the formula shown in column 1, lines 25–30 are prepared by substituting other α-substituted-acetic acid esters for the ethyl α-chloroacetate in Example I, other α-substituted-N-substituted-acetamides for the amides in Examples II–VIII, and alkali metal salts of dimers of hydrocarbylsulfonyl-acetonitriles, cyanoacetic esters of cyanoacetamides for the sodium salt of malononitrile dimer in Examples I–VIII.

The α-substitutedacetic esters and amides are well-known compounds. The dimer of ethyl cyanoacetate (EtOOC—C(CN)=C(NH$_2$)—CH$_2$COOEt) is prepared according to Baron et al., J. Chem. Soc. 85, 1736 (1904). The dimer of cyanoacetic acid is obtained from the dimer of ethyl cyanoacetate by hydrolysis, for example, by Method 249 of Wagner and Zook, "Synthetic Organic Chemistry," John Wiley & Sons, 1953, pages 416–17. Other esters are prepared by ester interchange as in Method 294 of Wagner and Zook, opt. cit., page 486. The dimer of ethyl cyanoacetate is converted to the corresponding bis(amide) and bis(N-substitutedamides) by reaction with concentrated ammonia, primary amines or secondary amines by Method 352 of Wagner and Zook, op. cit., pages 568–9. For example, reaction with ammonia yields 3-amino-2-cyano-2-pentene-1,5-dioic acid diamide, i.e., the dimer of cyanoacetamide. Reaction with aniline yields the corresponding di(N-phenylamide), i.e., the dimer of cyanoacetanilide, and reaction with N-benzyl-N-methylamine yields the corresponding di(N-benzyl-N-methylamide), i.e., the dimer of N-benzyl-N-methylcyanoacetamide.

The dimer of p-toluenesulfonylacetonitrile is prepared as follows:

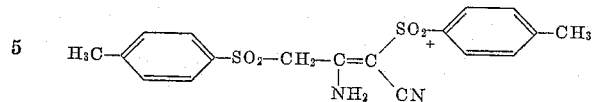

To a solution of 23 parts of sodium in 3947 parts of ethanol at 0° C. is added 390 parts of p-toluenesulfonylacetonitrile. The mixture is then heated at reflux for 2.5 hours and allowed to stand overnight at room temperature. The solution is diluted with 20,000 parts of water and carefully acidified with concentrated hydrochloric acid. p-Toluenesulfonylacetonitrile dimer (2-amino-1-cyano-1,3-di[p-toluenesulfonyl]propene) separates as a crystalline precipitate. This is separated by filtration and recrystallized from ethanol. Yield 245 parts, M.P. 194.5–195.5° C.

*Anaylsis.*—Calcd. for $C_{18}H_{18}N_2O_4S_2$: C, 55.38; H, 4.62; N, 7.18; S, 16.41. Found: C, 55.54; H, 4.61; N, 7.70, 7.38; S, 16.56.

In Table I below are shown the 5-cyanomethylene-2-pyrrolidones which are obtained when the indicated α-substitutedacetic esters or amides are substituted for ethyl chloroacetate and the alkali metal salts of the indicated dimers are substituted for the sodium salt of malononitrile dimer in the process of Example I.

TABLE I

| α-Substituted Acetic Ester or Amide | Sodium Salt of the Dimer of— | 5-Cyanomethylene-2-pyrrolidone Product |
|---|---|---|
| α-chloro-N-methyl-acetamide. | ethyl cyanoacetate. | 5-(α-cyano-α-ethoxycarbonyl)-methylene-4-ethoxycarbonyl-1-methyl-2-pyrrolidone. |
| α-chloro-N-ethyl-acetamide. | cyanoacetic acid. | 4-carboxy-5-(α-carboxy-α-cyano)methylene-1-ethyl-2-pyrrolidone. |
| ethyl α-chloroacetate. | octadecyl cyanoacetate. | 5-(α-cyano-α-octadecyloxycarbonyl)methylene-4-octadecyloxycarbonyl-2-pyrrolidone. |
| dodecyl α-chloroacetate. | cyanoacetamide. | 4-carbamoyl-5-(α-carbamoyl-α-cyano)methylene-2-pyrrolidone. |
| α-bromo-N-methyl-acetamide. | cyanoacetanilide. | 5-(α-cyano-α-N-phenylcarbamoyl)-methylene-1-methyl-4-N-phenylcarbamoyl-2-pyrrolidone. |
| α-bromo-N-methyl-acetamide. | N-benzyl-N-methylcyanoacetamide. | 4-(N-benzyl-N-methylcarbamoyl)-5-(α-[N-benzyl-N-methyl-carbamoyl]-α-cyano)methylene-1-methyl-2-pyrrolidone. |

5-cyanomethylene-2-pyrrolidones illustrative of the scope of the present invention may also be prepared from some of the compounds already shown by employing known techniques. For example, when the 4-cyano-5-dicyanomethylene-1-β-hydroxyethyl-2-pyrrolidone of Part A of Example VIII is treated with phosphorus trichloride by Method 52 of Wagner and Zook, op. cit., page 91, 1-β-chloroethyl-4-cyano-5-dicyanomethylene-2 - pyrrolidone is obtained. Phosphorus tribromide yields the corresponding 1-β-bromoethyl-4-cyano-5-dicyanomethylene-2-pyrrolidone. When the latter compound is treated with diphenylamine, 4-cyano-5-dicyanomethylene-1-β-(N,N-diphenylamino)ethyl-2-pyrrolidone is obtained.

When the 4-cyano-5-dicyanomethylene-1-methyl-2-pyrrolidone of Example II is treated with bromine, 4-bromo-4-cyano-5-dicyanomethylene-1-methyl-2-pyrrolidone is obtained. When this intermediate is treated with sodium cyanide in liquid hydrogen cyanide using a catalytic amount of pyridine, the net effect is the removal of HBr and the addition of HCN to yield 3,4-dicyano-5-dicyanomethylene-2-pyrrolidone. This compound may also be prepared by the process shown on page 2.

When methyl N-methyloxamate is used in place of diethyl oxalate in the reaction with the sodium salt of malononitrile dimer according to the procedure of Carboni et al., J. Am. Chem. Soc., 80, 2838–40 (1958), the sodium salt of 4-cyano-5-dicyanomethylene-3-hydroxy-1-methyl-2-oxo-3-pyrroline is obtained. This compound is converted to the corresponding 3-chloro and 3-bromo compounds by reaction with oxalyl chloride and phosphorus tribromide respectively. When these two halides are reduced by chemical means such as by treatment with hydrogen sulfide, 3-chloro-4-cyano-5-dicyanomethylene-1-methyl-2-pyrrolidone and 3-bromo-4-cyano-5-dicyanomethylene-1-methyl-2-pyrrolidone are obtained.

When 3-chloro-4-cyano-5-dicyanomethylene-1-methyl-2-oxo-3-pyrroline is treated with sodium p-toluenesulfinate and the product is reduced by chemical means such as by treatment with hydrogen sulfide, 4-cyano-5-dicyanomethylene-1-methyl-3-p-toluenesulfonyl-2-pyrrolidone is obtained.

When the ethyl ester of glycine is acylated with α-bromoacetyl bromide by Method 348 of Wagner and Zook, op. cit., page 566, the ethyl ester of N-(α-bromoacetyl)glycine is obtained. This reacts with the sodium salt of malononitrile dimer according to the procedure of Example II to yield 4-cyano-5-dicyanomethylene-1-ethoxycarbonylmethyl-2-pyrrolidone. When this is hydrolyzed by treatment with aqueous sodium hydroxide, followed by acidification, 1-carboxymethyl-4-cyano-5-dicyano-methylene-2-pyrrolidone is obtained. If instead of sodium hydroxide, ammonia or dimethylamine is employed, the respective products are 1-carbamoylmethyl-4-cyano-5-dicyanomethylene-2-pyrrolidone and 1-N,N-dimethylcarbamoylmethyl-4-cyano-5-dicyanomethylene-2-pyrrolidone.

When 1-carboxymethyl-4-cyano-5-dicyanomethylene-2-pyrrolidone is treated with ethyl chloroformate in the presence of triethylamine and the product is further treated with diethyl cadmium, 1-acetylmethyl-4-cyano-5-dicyanomethylene-2-pyrrolidone is obtained.

When taurine is acylated with α-bromoacetyl bromide, N-(α-bromoacetyl)taurine is obtained. This reacts with the sodium salt of malononitrile according to the procedure of Example II to yield 4-cyano-5-dicyanomethylene-1-β-sulfoethyl-2-pyrrolidone.

When ethyl glycolate is treated with β-methoxyethylamine and the resulting N-(β-methoxyethyl)glycolamide is treated with p-toluenesulfonyl chloride in the presence of alkali, N-(β-methoxyethyl)-α-p-toluenesulfonyloxyacetamide is obtained. This reacts with the sodium salt of malononitrile dimer in the manner of Example II to yield 4-cyano-5-dicyano-methylene-1-β-methoxyethyl-2-pyrrolidone.

It will be obvious to one skilled in the art that by suitable interchange of the several types of dimers and the several types of α-substituted acetic esters and amides in reactions analogous to those described above all of the compounds within the scope of the formula on page one may be prepared.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. Compounds having the formula

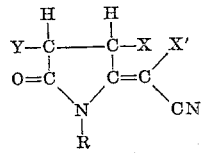

wherein R is a member of the class consisting of hydrogen, hydrocarbon and substituted hydrocarbon groups, the substituents on the said substituted hydrocarbon groups being selected from the class consisting of halogen, R'O, oxo, —NR'R, cyano, carboxyl, carbamyl, acyl and sulfo; X and X' are members of the class consisting of —CN, —SO$_2$R', —COOR', and —CONR'R'; Y is a member of the class consisting of hydrogen, —CN, —SO$_2$R' and halogen; and R' is a member of the class consisting of hydrogen and hydrocarbon groups.

2. 4-cyano-5-dicyanomethylene-2-pyrrolidone.
3. 4-cyano-5-dicyanomethylene-1-methyl-2-pyrrolidone.
4. 1-butyl-4-cyano-5-dicyanomethylene-2-pyrrolidone.
5. 4-cyano-5-dicyanomethylene-1-ethyl-2-pyrrolidone.
6. 1-allyl-4-cyano-5-dicyanomethylene-2-pyrrolidone.
7. 1-benzyl-4-cyano-5-dicyanomethylene-2-pyrrolidone.
8. 4-cyano-1β-cyanoethyl-5-dicyanomethylene-2-pyrrolidone.
9. 4-cyano-5-dicyanomethylene-1-β-hydroxyethyl-2-pyrrolidone.
10. Process which comprises reacting a compound of the formula

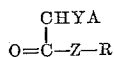

wherein A is a member of the class consisting of —Cl, —Br, and —SO$_2$R'; Y is a member of the group consisting of hydrogen, —CN, —SO$_2$R' and halogen; Z is a member of the group consisting of —O— and —NH—; R is a member of the class consisting of hydrogen, hydrocarbon and substituted hydrocarbon groups, the substituents on said substituted hydrocarbon groups being selected from the class consisting of halogen, R'O, oxo, NR'R, cyano, carboxyl, carbamyl, acyl and sulfo; and R' is a member of the class consisting of hydrogen and hydrocarbon groups; with a compound of the formula

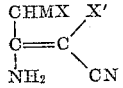

wherein M is an alkali metal and X and X' are members of the class consisting of —CN, —SO$_2$R', —COOR' and —CONR'R', whereupon there is obtained a compound of the formula

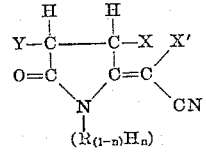

wherein R, X, X' and Y have the same significance as above, with the proviso that $n$ is zero when Z of the first reactant is —NH— and when said Z is —O—, $n$ is one.

References Cited in the file of this patent

UNITED STATES PATENTS

| | | |
|---|---|---|
| 2,805,158 | Ganguin et al. | Sept. 3, 1957 |
| 2,806,856 | Robinson | Sept. 17, 1957 |
| 2,820,798 | Bailey et al. | Jan. 21, 1958 |
| 2,846,307 | Wooley | Aug. 5, 1958 |

UNITED STATES PATENT OFFICE
CERTIFICATE OF CORRECTION

Patent No. 3,013,018                        December 12, 1961

Clifford L. Dickinson, Jr.

It is hereby certified that error appears in the above numbered patent requiring correction and that the said Letters Patent should read as corrected below.

Column 12, line 5, for "-NR'R" read ---NR'R' --; line 39, for "NR'R" read -- NR'R' --.

Signed and sealed this 2nd day of October 1962.

(SEAL)
Attest:

ERNEST W. SWIDER
Attesting Officer

DAVID L. LADD
Commissioner of Patents